United States Patent
Bachman et al.

(10) Patent No.: US 9,340,417 B2
(45) Date of Patent: May 17, 2016

(54) MAGNETIC RECOVERY METHOD OF MAGNETICALLY RESPONSIVE HIGH-ASPECT RATIO PHOTORESIST MICROSTRUCTURES

(75) Inventors: Mark Bachman, Irvine, CA (US); Edward Nelson, Irvine, CA (US); Nicholas Gunn, Newport Beach, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 13/535,296

(22) Filed: Jun. 27, 2012

(65) Prior Publication Data

US 2013/0023438 A1    Jan. 24, 2013

Related U.S. Application Data

(60) Provisional application No. 61/502,695, filed on Jun. 29, 2011.

(51) Int. Cl.
*B82Y 15/00* (2011.01)
*C40B 40/00* (2006.01)
*C40B 60/00* (2006.01)

(52) U.S. Cl.
CPC ............... *B82Y 15/00* (2013.01); *C40B 40/00* (2013.01); *C40B 60/00* (2013.01)

(58) Field of Classification Search
CPC ................ B01J 9/0046; B01J 2219/00659; B82Y 30/00; C40B 40/02
See application file for complete search history.

(56) References Cited

U.S. PATENT DOCUMENTS

| 7,172,795 | B2 * | 2/2007 | Lambertini et al. | 427/510 |
| 7,695,954 | B2 | 4/2010 | Bachman et al. | |
| 7,759,119 | B2 | 7/2010 | Allbritton et al. | |
| 7,951,580 | B2 | 5/2011 | Li et al. | |
| 2007/0292312 | A1 * | 12/2007 | Bachman et al. | 422/82 |
| 2008/0268545 | A1 * | 10/2008 | Tajima | 436/94 |
| 2010/0288705 | A1 * | 11/2010 | Griebel | 210/695 |

OTHER PUBLICATIONS

Gunn, N. et al 2010 Langmuir 26: 17703-17711.*

* cited by examiner

*Primary Examiner* — Samuel Woolwine
*Assistant Examiner* — Kaijiang Zhang
(74) *Attorney, Agent, or Firm* — ONE LLP

(57) ABSTRACT

Systems and methods that facilitate magnetic collection and/or manipulation of individual micropallets are provided. The embodiments provided herein are directed to a new method for collecting micropallets once released from a substrate. It is accomplished by endowing the micropallets with magnetic properties by incorporating ferromagnetic or superparamagnetic nanoparticles into the photoresist material or otherwise incorporating magnetically responsive material into the micropallet structure. The magnetic particles, which posses magnetic qualities, e.g., ferromagnetism, ferrimagnetism, paramagnetism, and are composed of iron, nickel, and/or other magnetic materials, are mixed into the bulk photoresist prior to its use in the fabrication of microstructures. Also covered are other methods of incorporating magnetically-attractable material into the micropallet structure, such as plating of the micropallets with a material that is magnetically responsive, such as nickel. Additionally, the embodiments provided include a "collection probe" that is used to collect the released magnetic micropallets.

10 Claims, 9 Drawing Sheets

MAGNETIC RECOVERY METHOD OF MAGNETICALLY RESPONSIVE HIGH-ASPECT RATIO PHOTORESIST MICROSTRUCTURES

CROSS-REFERENCE TO RELATED APPLICATION

This application claims benefit under 35 U.S.C. §119(e) from U.S. Provisional Patent application No. 61/502,695, filed on Jun. 29, 2011, the entirety of which is incorporated by reference herein.

FIELD

The embodiments described herein generally relate to micropallet arrays, and more particularly, to systems and methods that enable magnetic collection and/or manipulation of individual micropallets.

BACKGROUND OF THE INVENTION

Understanding the biology of individual cells within complex microenvironments has proven to be a particular challenge despite the increasing number and variety of tools available for the analysis of single cells at the cellular and molecular levels, including microscopy, polymerase chain reaction (PCR), patch-clamp, and microanalytical chemical separations. One obstacle to being able to gain this understanding is the limited set of tools that permit the selection of a single cell of defined phenotype from a large cellular population, for example, fluorescence-activated cell sorting (FACS) or laser capture microdissection. The repertoire of available tools is further diminished when one is interested in recovering a single adherent cell from culture with minimal cellular perturbation, that is, without the need to strip the cell from the growth surface such as is required with popular cell-sorting technologies such as FACS or if maintenance of cellular viability is important.

A microtechnology for the isolation and collection of single adherent cells from large heterogeneous populations has been previously reported. (See Wang, Y.; Sims, C. E.; Marc, P.; Bachman, M.; Li, G. P.; Allbritton, N. L. Langmuir 2006, 22, 8257-8262; To'a Salazar, G.; Wang, Y.; Young, G.; Bachman, M.; Sims, C. E.; Li, G. P.; Allbritton, N. L. Anal. Chem. 2007, 79, 682-687; Wang, Y.; Young, G.; Bachman, M.; Sims, C. E.; Li, G. P.; Allbritton, N. L. Anal. Chem. 2007, 79, 2359-2366; and Wang, Y.; Young, G.; Aoto, P. C.; Pai, J.; Bachman, M.; Li, G. P.; Sims, C. E.; Allbritton, N. L. Cytometry, Part A 2007, 71A, 866-874.) This "micropallet array" technology is a unique cell-handling platform that comprises hundreds of thousands of microscale pedestals ("micropallets"). Micropallet arrays are constructed using standard photolithographic techniques from high aspect ratio photoresist, and the technology was developed using the popular epoxy-based negative photoresist SU-8.

A new high aspect ratio negative photoresist, called "1002F photoresist", for micropallet array fabrication has also been reported. (See Pai, J.; Wang, Y.; Salazar, G. T.; Sims, C. E.; Bachman, M.; Li, G. P.; Allbritton, N. L. Anal. Chem. 2007, 79, 8774-8780.) 1002F photoresist is similar to SU-8 but offers improved biophysical properties over SU-8, specifically markedly lower autofluorescence across a broad range of UV and visible light wavelengths, and increased biocompatibility and support for cell adhesion as compared with SU-8. (Id.)

In the current state of the technology, individual micropallets that are released from the micropallet array are transferred to collection wells by inverting the micropallet array over a large collection area or array of collection wells. The released micropallets (free floating) fall into the collection well(s) via the action of gravity, while unreleased micropallets remained affixed to the glass substrate. The disadvantages to this method are several fold: 1) Generally only one micropallet can be released and collected in each inversion process (due to confusion of micropallet identities if multiple, un-indexed micropallets are simultaneously released and collected); 2) In the inversion method, the array of collection wells must be scanned to find the released micropallet. These two disadvantages dramatically reduce the achievable throughput of the system; 3) By nature of this method, the collected micropallet is present within a relatively very large volume of liquid after collection. While appropriate for clonal expansion of the collected cell, for single cell PCR analysis of the cell's DNA or RNA, the cell must first be moved to a much smaller volume of liquid.

Therefore, an improved micropallet that facilitates collection and/or manipulation is desirable.

BRIEF SUMMARY OF THE EMBODIMENTS

The embodiments provided herein are directed to systems and methods that facilitate magnetic collection and/or manipulation of individual micropallets. Micropallets are photoresist microstructures that hold (single/small numbers of) adherent cells in culture. Micropallets can be released from an underlying substrate using a high powered laser, after which the micropallets are recoverable with the cells still adhered. The embodiments provided herein are directed to a new method for collecting the micropallets once released from the substrate. It is accomplished by endowing the micropallets with magnetic properties by incorporating ferromagnetic or superparamagnetic nanoparticles into the photoresist material or otherwise incorporating magnetically responsive material into the micropallet structure. The magnetic particles, which posses magnetic qualities, e.g., ferromagnetism, ferrimagnetism, paramagnetism, and are composed of iron, nickel, and/or other magnetic materials, are mixed into the bulk photoresist prior to its use in the fabrication of microstructures. Also covered are other methods of incorporating magnetically-attractable material into the micropallet structure, such as plating of the micropallets with a material that is magnetically responsive, such as nickel.

Additionally, the embodiments provided include a "collection probe" that is used to collect the released magnetic micropallets. Three types of collection probes are provided: 1) A collection probe based on an electro magnet; 2) A collection probe that features a removable permanent magnet that allows immediate generation/cessation of a local magnetic field to attract and hold the micropallets. This probe design features a collection cavity that keeps the collected micropallet submerged in liquid throughout the entire transfer process; 3) A collection probe that has a releasable permanent magnet portion to which the micropallet is attracted. The permanent magnet portion is released from the probe to transfer the micropallet, with the micropallet still connected (attracted) to the magnetic portion of the probe.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that the invention is not limited to the details of the example embodiments.

BRIEF DESCRIPTION OF THE DRAWINGS

The details of the invention, both as to its structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

DETAILED DESCRIPTION OF THE INVENTION

A detailed discussion regarding systems and methods that facilitate magnetic collection and/or manipulation of individual micropallets is provided hereafter.

Figure 1A:
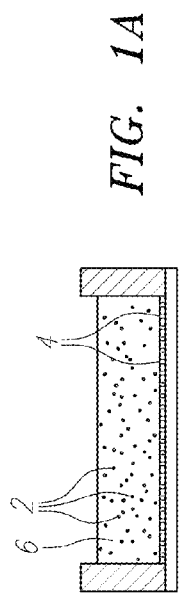
FIG. 1(A) is a schematic illustration showing a method of release of a single micropallet and adhered cell.

FIGS. 1(A)-(D) are schematic illustration showing micropallet release and recovery process. FIG. 1(A) is a schematic illustration showing a method of release of a single micropallet and adhered cell. Each micropallet of the array can hold one or more cells in culture, and any one micropallet can be selectively released from the substrate using a focused laser pulse. On the top of FIG. 1(A), cells 2 are applied to the micropallet array 4 as a suspension of single cells in cell culture media 6. On the middle of FIG. 1(A), cells are allowed to settle onto the surface of the array and adhere to individual micropallets over a period of 0.3 to 4 hours. On the bottom of FIG. 1(A), a single micropallet can be selectively released using a pulsed laser 8 that is focused at the interface of the micropallet and glass substrate 10. Viability of the adherent cell is maintained throughout the release process and subsequent recovery.

Figure 1B:
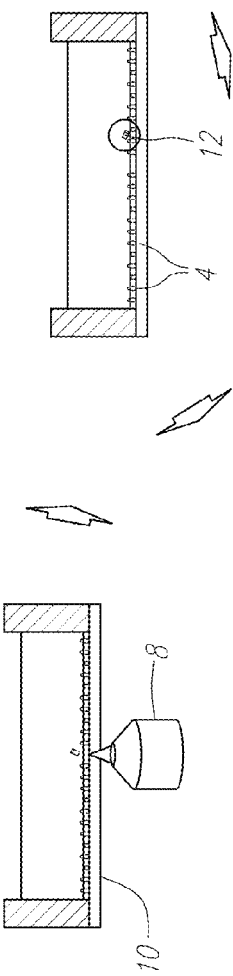
FIG. 1(B) is a schematic illustration showing that after release, the micropallet, circled, comes to rest on the surface of the array, from where it remains to be collected.

FIG. 1(B) is a schematic illustration showing that after release, the micropallet 12, circled, comes to rest on the surface of the array 4, from where it remains to be collected.

Figure 1C:
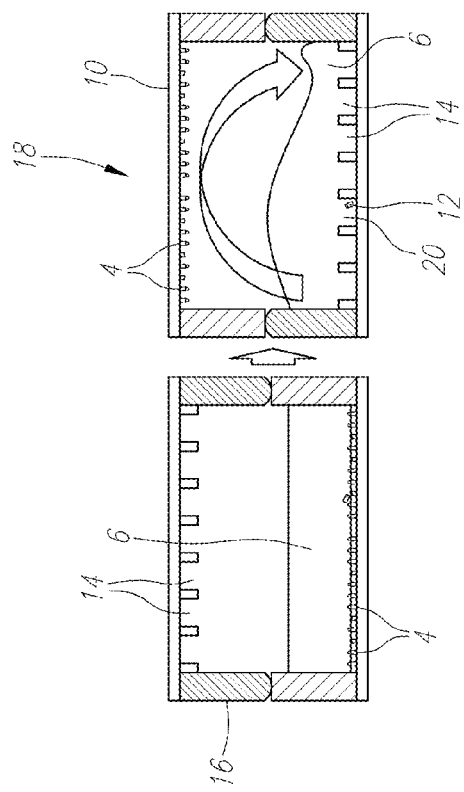
FIG. 1(C) is a schematic illustration showing a traditional method of collection of released micropallets.

Released micropallets 12 come to rest on the surface of the array 4 and were originally collected via a simple inversion process that allows them to fall freely into an array of collection wells. FIG. 1(C) is a schematic illustration showing a traditional method of collection of released micropallets. On the left of FIG. 1(C), an array of collection wells 14 with rubber gasket 16 is temporarily mated to the micropallet array 4 by pressing the two together. On the right of FIG. 1(C), the configuration 18 is inverted, which transfers the liquid 6 and any released micropallets 12 onto the array of collection wells 14. The released micropallet 12 settles into a well 20 at random.

The process illustrated in FIG. 1(C) requires that the micropallet array 4 be temporarily sealed against an array of collection wells 14 and the whole configuration 18 inverted 180°. Gravity causes any micropallets not attached to the substrate 10 (i.e., released micropallets) to fall onto the array of collection wells 14 and settle into one or more wells. Any liquid 6 that was covering the micropallet array 4 at the beginning of the transfer process is also transferred such that it now is covering the collection wells 14.

Although the process illustrated in FIG. 1(C) provided proof of principle for the recovery of single adherent cells from the micropallet array, it has many obvious drawbacks. These include: the inadvertent collection of nontarget cells that lose adherence to micropallets, the transient exposure to air for the remaining adherent cells on the micropallet array, the large volume of collection fluid, the requirement to search the array of collection wells to locate collected micropallet(s), and very low through-put capacity. Nevertheless, this collection strategy may be appropriate for clonal expansion of limited numbers of collected cells. However, for single-cell molecular analyses such as DNA- or RNA-based PCR analysis or similar single cell investigations, a much smaller collection volume is required, and higher throughput is desired. Therefore, refinements are needed to enable the efficient application of the micropallet technology to single-cell analyses that will enable biologists to dissect the biology of single cells in complex cell mixtures and tissues.

A new strategy to collect and transfer micropallets after release from the micropallet array is provided. The cornerstone of this strategy is to endow the micropallets with susceptibility to magnetic fields, which is accomplished by incorporating magnetic material, namely, ferromagnetic nanoparticles, into their structure. The resultant ferromagnetic micropallet could have a level of ferromagnetic responsiveness sufficient to allow its manipulation using low-strength magnetic fields, potentially enabling the capture of individual micropallets using small permanent or electromagnets and transfer to analysis vessels with limited fluid volumes.

Figure 1D:
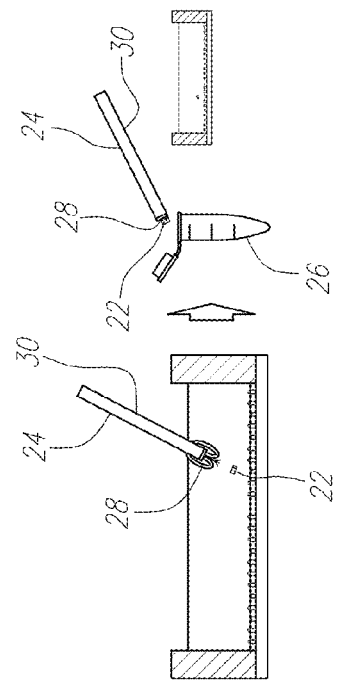
FIG. 1(D) is a schematic illustration of an exemplary embodiment of a magnetic collection method of the present invention.

FIG. 1(D) is a schematic illustration of an exemplary embodiment of a magnetic collection method of the present invention. On the left of FIG. 1(D), the micropallet 22 can be collected with the use of a magnetic probe 24. When the probe 24 is brought near the micropallet 22, the micropallet 22 moves into contact with it because of magnetic attraction. On the right of FIG. 1(D), the micropallet 22 and adhered cell can be delivered precisely to any location or downstream analysis vessel 26, for example, a PCR tube.

The properties of the micropallets that make micropallet arrays especially effective in sorting adherent cells, that is, their biocompatibility, ability to be coated with extracellular matrix (ECM) protein coatings, transparency at the wavelengths of visible and UV light, and low autofluorescence, should not be compromised if this refinement to the micropallet array technology is to be broadly applicable to biological studies. This disclosure is directed to systems and method that facilitate the formation of a ferromagnetic micropallet with preservation of these critical biophysical properties and development of a micropallet array in which each individual micropallet can be magnetically manipulated after its release from the array.

Preparation of Ferromagnetic Photoresist.

Ferromagnetic photoresist (FM1002F) can be prepared by mixing dry iron (II, III) oxide nanoparticles (<50 nm particle size (TEM), ≥98% trace metals basis) (Sigma-Aldrich, St. Louis, Mo.) in 1002F photoresist. The 1002F photoresist can be prepared by dissolving EPON resin 1002F (phenol, 4,4'-(1-methylethylidene)bis-, polymer with 2,2'-((1-methylethylidene)bis(cyclohexane-4,1-diyloxymethylene))bisoxirane) (Miller-Stephenson, Sylmar, Calif.) and UVI-6976 photoinitiator (triarylsulfonium hexafluoroantimonate salts in propylene carbonate, Dow Chemical, Torrance, Calif.) in γ-butyrolactone (GBL) (Sigma-Aldrich) at a ratio of 61% 1002F resin/6.1% photoinitiator/32.9% solvent (weight percentage). (See Pai, J.; Wang, Y.; Salazar, G. T.; Sims, C. E.; Bachman, M.; Li, G. P.; Allbritton, N. L. Anal. Chem. 2007, 79, 8774-8780.)

The iron oxide nanoparticles (FeNPs) can be added to 1002F photoresist at seven different doping ratios, measured by weight, to create FM1002F with different levels of FeNP content. The set of doped photoresists ranged from 1:200 to 1:2 doping by weight (nanoparticles: 1002F) and consisted of [1:200, 1:100, 1:50, 1:20, 1:10, 1:5, 1:2]. The dry nanoparticles can be mixed in 1002F photoresist via mechanical stirring using a RW20 digital mechanical stirrer (IKA, Wilmington, N.C.) at 300 rpm for 30 min to create a suspension of nanoparticles in 1002F photoresist. The suspension can be centrifuged at 2600 g for 30 min to pellet aggregates of nanoparticles, and the supernatant was collected as the final preparation of FM1002F. The FM1002F is preferably be used within 48 h to avoid further settling of nanoparticles, even though noticeable settling was not observed for up to 1 week after preparation.

X-ray Microanalysis.

To quantify the amount of ferromagnetic material present in fabricated structures (e.g., micropallets), samples of FM1002F can be analyzed using energy dispersive X-ray spectroscopy to determine elemental iron content. The samples can be spin-coated on glass slides, flood exposed with UV radiation, and hard-baked, which is analogous to the processing of FM1002F during the fabrication of microstructures. Samples of all doping ratios can be prepared along with a duplicate set prepared identically, except that the ferromagnetic photoresist was not centrifuged during preparation. Analysis can be performed using a Zeiss EVO LS15 scanning electron microscope equipped with a Thermo System 7 energy dispersive X-ray microanalysis system to obtain measurements at five points across the slide for each sample, which were averaged. A unitless ratio of iron content to carbon content was found for each sample, which was then used to back-calculate the content of FeNPs in the fabricated structures.

Spectral Analysis of FM1002F Transparency.

The seven preparations of resist described above, along with standard 1002F, can be spin-coated, flood exposed with UV radiation, and hard-baked to create uniform, solid, 50 μm thick coatings on standard 1×3 in. glass slides. The transmission spectra of the samples can be determined using a USB2000 spectrometer (Ocean Optics, Dunedin, Fla.) to measure the transmittance of light from a DT1000 CEUV/vis light source (Analytical Instrument Systems, Flemington, N.J.). Samples were analyzed such that the light was incident on the photoresist-coated side of the slide and transmission was detected at the reverse side. For each sample, the transmissions at five points across the slide were measured and averaged to formulate each data point.

Study of Cell Viability on FM1002F.

Biocompatibility of the FM1002F was investigated using solid substrates prepared in the same manner as described above. Substrates of 1002F at doping ratios of 1:20 and 1:10 were prepared as well as undoped 1002F and plain glass slides for comparison. Plastic four-well chambers taken from LabTek chamber slides (Nunc, Naperville, Ill.) were reattached to the photoresist substrates using polydimethylsiloxane (PDMS) to demarcate 9×20 mm regions for each experiment. The substrates were coated with human plasma fibronectin (Millipore, Billerica, Mass.) to provide an ECM protein coating for cellular attachment. (See Gunn, N.; Bachman, M.; Li, G.; Nelson, E. J. Biomed. Mater. Res., Part A 2010, 95, 401-412.) In brief, fibronectin, diluted to 20 μg/mL in deionized water, was applied to each chamber, incubated at room temperature for 1 h, and washed with phosphate buffered saline (PBS). NIH/3T3 fibroblast cells (CRL-1658, ATCC, Manassas, Va.) were applied to the photoresist substrates at seeding densities of 5000 cells/mL/well and incubated at 37° C. and 10% $CO_2$ to permit cellular proliferation. A total of eight wells were initially seeded for each substrate, to be analyzed at various time points, specifically 24, 48, 72, and 96 h. Two wells were analyzed per time point. The cells were collected using trypsin-EDTA solution (0.25% trypsin; 1 mM EDTA) and the number of cells recovered per well was determined using an Accuri C6 flow cytometer (Accuri Cytometers, Ann Arbor, Mich.) with identical gating (encompassing only healthy cells) for each sample.

Photolithographic Patterning of FM1002F.

To assess the impact of incorporation of FeNPs in 1002F photoresist on its capacity to construct microstructures, the set of FM1002F photoresists can be patterned into microstructures. Photolithographic patterning can be performed according to the recipe for plain 1002F photoresist, which uses standard lithographic techniques. (See Pai, J.; Wang, Y.; Salazar, G. T.; Sims, C. E.; Bachman, M.; Li, G. P.; Allbritton, N. L. Anal. Chem. 2007, 79, 8774-8780; Gunn, N.; Bachman, M.; Li, G.; Nelson, E. J. Biomed. Mater. Res., Part A 2010, 95, 401-412.) In brief, 50 μm thick coatings of FM1002F photoresist can be obtained by spin-coating and baking the photoresist on clean 1×3 in glass slides. The microstructures were patterned by exposure to collimated UV light (6 mW/$cm^2$) (Oriel, Newport Stratford, Stratford, Conn.) through a photomask for 200 s (total energy of 1200 mJ/$cm^2$) and postexposure baked, developed with SU-8 developer (MicroChem, Newton, Mass.), and hard-baked at 120° C. For doping ratios 1:5 and 1:2, the length of UV exposure was increased to 260 s (total energy of 1560 mJ/$cm^2$) to compensate for attenuation of the UV light by the nanoparticles. The aim of the photomask's pattern was to test the achievable limits (minimal critical dimension and aspect ratio) for the FM1002F photoresists; it consisted of a dark-field pattern of arrayed squares with variable sizes (25 to 200 µm side length) and spacings (10 to 75 µm).

Fabrication of Magnetic Micropallet Arrays.

FM1002F photoresists at doping ratios of 1:200 to 1:10 can be used to fabricate micropallet arrays with the following dimensions: each micropallet had a 40×40 µm cross section, 50 µm height, and 30 µm spacing between neighboring micropallets. Microfabrication can be completed using the previously described protocol for fabricating micropallet arrays with standard 1002F photoresist and is the same protocol used to investigate the photopatternability of FM1002F. (See Pai, J.; Wang, Y.; Salazar, G. T.; Sims, C. E.; Bachman, M.; Li, G. P.; Allbritton, N. L. Anal. Chem. 2007, 79, 8774-8780; Gunn, N.; Bachman, M.; Li, G.; Nelson, E. J. Biomed. Mater. Res., Part A 2010, 95, 401-412.) The micropallet arrays can be treated with silane vapor deposition using (heptadecafluoro-1,1,2,2-tetrahydrodecyl)trichlorosilane (Gelest, Morrisville, Pa.) to create a highly hydrophobic silane monolayer on the micropallet and glass surfaces. This hydrophobicity causes air to become trapped in the intermicropallet spaces upon wetting of the arrays, and these "airwalls" or "virtual walls" serve as the mechanism for cell sequestration to the top surfaces of individual micropallets. (See Wang, Y.; Sims, C. E.; Marc, P.; Bachman, M.; Li, G. P.; Allbritton, N. L. Langmuir 2006, 22, 8257-8262; Gunn, N.; Bachman, M.; Li, G.; Nelson, E. J. Biomed. Mater. Res., Part A 2010, 95, 401-412.)

It is observed that the incorporation of iron nanoparticles in the 1002F photoresist did not impact the effectiveness of the silane treatment to support virtual walls. To complete the fabrication, LabTek chamber slides can be attached to the micropallet arrays using PDMS (see Gunn, N.; Bachman, M.; Li, G.; Nelson, E. J. Biomed. Mater. Res., Part A 2010, 95, 401-412), and held cell culture media and other reagents for subsequent experiments.

Coating of Magnetic Micropallets with Biomolecules.

To support cellular adhesion, particularly for primary cells, micropallets are preferably be coated with an appropriate biomolecule or ECM coating. Methods to coat effectively micropallet arrays with a variety of ECM coatings, including fibronectin, collagen, and laminin, such that each individual micropallet has a uniform and well-adhered coating on its top surface have been reported. (See Gunn, N.; Bachman, M.; Li, G.; Nelson, E. J. Biomed. Mater. Res., Part A 2010, 95, 401-412.) The adhesion and uniformity of fibronectin coatings on micropallet arrays fabricated from 1:50 and 1:10 preparations of FM1002F were investigated and compared with fibronectin coatings on micropallet arrays made from standard 1002F.

Fibronectin can be applied to the ferromagnetic micropallets, as described above and previously reported. (See Gunn, N.; Bachman, M.; Li, G.; Nelson, E. J. Biomed. Mater. Res., Part A 2010, 95, 401-412.) For characterization of coating efficiency using fluorescence imaging, fibronectin was detected by immunofluorescence using antifibronectin rabbit polyclonal antibody (Cat no. F3648, Sigma-Aldrich) as the primary antibody and FITC-conjugated AffiniPure F(ab')2 fragment donkey antirabbit IgG (H+ L) as the secondary antibody (Cat no. 711-096-152, Jackson ImmunoResearch, West Grove, Pa.). The antibodies were used according to the manufacturers' instructions. Negative controls to measure nonspecific binding of the antibodies included (1) arrays not coated with fibronectin and subjected to the full staining protocol and (2) omission of the primary antifibronectin antibody. Imaging was done using an LSM 510 meta laser scanning confocal microscope with appropriate FITC filter set.

Immunofluorescence Imaging of Cells on Magnetic Micropallets.

Rat neu-expressing NIH/3T3 cells (CRL-1915, ATCC) can be plated onto fibronectin-coated micropallet arrays made from FM1002F doped at 1:50 and 1:10 ratios. After an incubation period of 3 h at 37° C./10% $CO_2$ to allow for cellular adherence, the cells were stained with antibodies against rat neu and the Hoechst 33342 nuclear stain as follows. The micropallet array was washed two times with blocking buffer (Hank's buffered saline solution (HBSS) with 6% bovine serum albumin (BSA) and 0.1% sodium azide), followed by incubation in blocking buffer for 30 min. The array was washed two times with staining buffer (HBSS with 1% BSA and 0.1% sodium azide), followed by 30 min of incubation with 0.5 ug/mL rat neu monoclonal antibody (clone 7.16.4, EMD/Calbiochem, San Diego, Calif.) in staining buffer supplemented with 20 ug/mL Hoechst 33342 (Invitrogen, Carlsbad, Calif.). The array was washed five times with staining buffer, incubated for 30 min with 4 ug/mL goat antimouse secondary antibody conjugated to Alexa Fluor 488 (Invitrogen), and finally washed five times with staining buffer to remove unbound secondary antibody. All incubations were at 37° C. and 10% $CO_2$, and all buffers were prewarmed to 37° C.

Release and Collection of Magnetic Micropallets.

Individual magnetic micropallets with single adhered cells can be released from the glass substrate of the array using a high-powered pulsed laser similar to previously described methods. (See Wang, Y.; Young, G.; Bachman, M.; Sims, C. E.; Li, G. P.; Allbritton, N. L. Anal. Chem. 2007, 79, 2359-2366; Wang, Y.; Young, G.; Aoto, P. C.; Pai, J.; Bachman, M.; Li, G. P.; Sims, C. E.; Allbritton, N. L. Cytometry, Part A 2007, 71A, 866-874; Quinto-Su, P. A.; To'a Salazar, G.; Sims, C. E.; Allbritton, N. L.; Venugopalan, V. Anal. Chem. 2008, 80, 4675-4679; Salazar, G. T.; Wang, Y.; Sims, C. E.; Bachman, M.; Li, G.; Allbritton, N. L. J. Biomed. Opt. 2008, 13, 034007-034007.) In brief, the pulsed laser is focused at the interface of the micropallet and underlying glass substrate and when activated creates a localized plasma within the focal volume of the laser. A shock wave is produced, and the plasma formation results in ablation of the polymer micropallet material within the focal volume. Rapidly expanding gas from the ablative process is trapped between the micropallet and the glass substrate and disrupts the polymer-glass interface, dislodging the micropallet from the glass. (See Quinto-Su, P. A.; To'a Salazar, G.; Sims, C. E.; Allbritton, N. L.; Venugopalan, V. Anal. Chem. 2008, 80, 4675-4679; Salazar, G. T.; Wang, Y.; Sims, C. E.; Bachman, M.; Li, G.; Allbritton, N. L. J. Biomed. Opt. 2008, 13, 034007-034007.) The micropallet is projected into the fluid and comes to rest on the surface of the array, generally within a few millimeters of its initial position.

Referring also to FIG. 1(D), a magnetic probe 24 can then be used to collect the micropallet 22. In the present embodiment, the magnetic probe 24 has a small, disk-shaped neodymium rare earth magnet 28. In one embodiment, the magnet is 1 mm in diameter and 0.5 mm in thickness. The magnet can be held at the end of a thin, 0.5 mm in diameter, stainless steel rod 30, from which it could be removed after collection of a micropallet 22. During collection, the magnet 28 can be simply brought into proximity of the released micropallet 22. At sufficiently close distance, the force of gravity is overcome by the magnetic force, and the micropallet 22 moves into contact with the magnet 28. The cell that is held on the micropallet can then be delivered to a downstream vessel 26, for example, a PCR tube, by delivery of the combined magnet/micropallet/cell assembly.

In one embodiment, the magnet of the probe 24 is an electro magnet. In another embodiment, the probe 24 has a removable permanent magnet that allows immediate generation/cessation of a local magnetic field to attract and hold the micropallets. This probe design features a collection cavity that keeps the collected micropallet submerged in liquid throughout the entire transfer process. In another embodiment, the probe 24 has a releasable permanent magnet portion to which the micropallet is attracted. The permanent magnet portion can be released from the probe to transfer the micropallet, with the micropallet still connected (attracted) to the magnetic portion of the probe.

Single Cell PCR.

Magnetic micropallets can be used to isolate and recover cells for single cell reverse transcription quantitative PCR (RT-qPCR) analysis as a demonstration of the utility of magnetic micropallets. Rat neu-expressing NIH/3T3 cells were plated on a micropallet array made from 1:50 FM1002F, which was cleaned with RNaseZap (Ambion, Austin, Tex.) and 70% ethanol before being coated with fibronectin, as above. Cells were allowed to adhere during a 3 h incubation at 37° C./10% $CO_2$; then, micropallets holding single cells were released and magnetically recovered, as described above. Recovered single cells were lysed for total RNA content, reverse transcribed for cDNA, cDNA preamplified, and analyzed for specific gene expressions by quantitative polymerase chain reaction (qPCR), all using the TaqMan PreAmp Cells-to-CtKit (Applied Biosystems, Foster City, Calif.) according to manufacturer's instructions. In brief, single magnetic micropallets with adhered single cells were transferred to PCR tubes containing 1 μL of cold 1×PBS and 10 μL of lysis solution with DNase I at 1:100 dilution for cell lysis to release total RNA. Empty micropallets were also collected and processed identically for no template controls (NTCs). For reverse transcription (RT) processing, 25 μL of RT buffer, 2.5 μL of RT enzyme mix, and 12.5 μL of nuclease-free water was added directly to the PCR tube. For -RT controls, the RT enzyme mix was replaced with water. Subsequently, 12.5 μL of cDNA containing reaction was preamplified prior to qPCR analysis for mouse β-Actin and rat neu by TaqMan gene expression assays (Mm01205647_g1 for mouse ss-Actin and Rn00566561_m1 for rat neu, Applied Biosystems).

Iron Oxide Nanoparticle Content of Ferromagnetic Photoresist.

Whereas the dry iron oxide nanoparticles were readily dispersed in the liquid 1002F photoresist by simple mechanical stirring, a homogeneous monodispersed mixture was not achieved. Rather, aggregates of nanoparticles remained throughout the composite preparation of ferromagnetic photoresist. It was observed that the aggregates were present in the nanoparticles, as obtained from the supplier, and not a consequence of being mixed with the photoresist. Several attempts were made to disrupt the aggregates, for example, by means of more vigorous mechanical stirring, sonication, grinding, and so on; however, these approaches were not successful. Therefore, centrifugation was ultimately used to improve greatly the homogeneity of the composite ferromagnetic photoresist by pelleting the larger aggregates out of suspension, leaving only single nanoparticles and very small aggregates in suspension.

As described above, the composite FM1002F photoresists can be made by mixing FeNPs into 1002F photoresist at seven different weight ratios. However, while useful for nomenclature, these weight ratios are not indicative of the final number of FeNPs present in structures fabricated from FM1002F. This is due to the loss of a portion of the FeNPs during centrifugation and also the evaporation of solvent from the photoresist during device fabrication, both of which act to alter the weight percentage of FeNPs in the processed FM1002F. During the X-ray microanalysis used to analyze the processed FM1002F samples, electron-excited characteristic X-rays are analyzed to determine elemental makeup of the sample. (See Goldstein, J.; Newbury, D. E.; Joy, D. C.; Lyman, C. E.; Echlin, P.; Lifshin, E.; Sawyer, L.; Michael, J. R. Scanning Electron Microscopy and X-Ray Microanalysis; Springer: New York, 2003.) According to computer simulation based on material properties, the majority of X-rays detected for this analysis were generated from an excitation volume extending from a depth of 1-6 μm into the 1002F material. Therefore, the analysis of the bulk material can be considered.

Figure 2A:
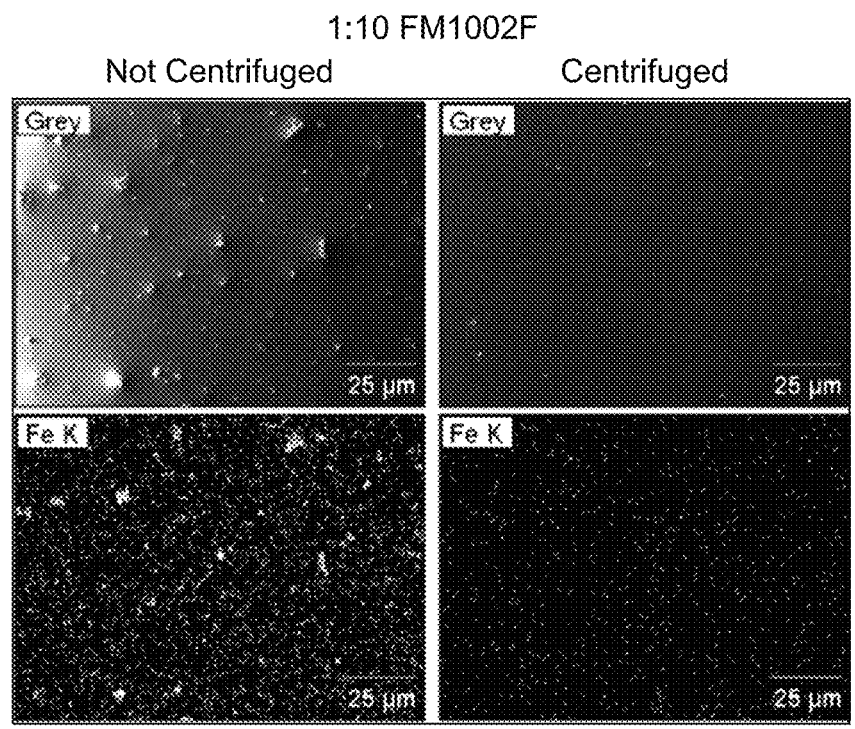
FIG. 2(A) shows SEM micrographs and 2D maps of elemental iron distribution for 150 μm square areas of samples of 1:10 FM1002F acquired using the Thermo System 7 microanalysis system.
Figure 2B:
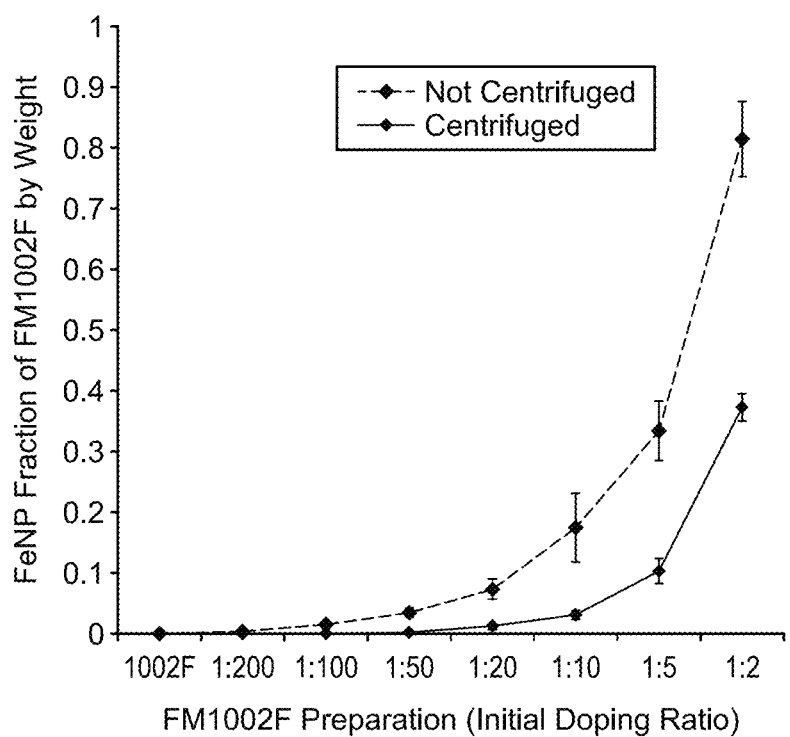
FIG. 2(B) depicts a graph showing the FeNP content, by weight fraction, of fully processed FM1002F with (solid line) and without (dashed line) centrifugal treatment for each doping ratio.

FIGS. 2(A)-(B) depict an iron oxide nanoparticle (FeNP) content of the ferromagnetic 1002F photoresist (FM1002F). Iron content was characterized using X-ray microanalysis. Centrifugal treatment of the liquid FM1002F preparations had the effect of removing aggregates of nanoparticles. FIG. 2(A) shows SEM micrographs and 2D maps of elemental iron distribution for 150 μm square areas of samples of 1:10 FM1002F acquired using the Thermo System 7 microanalysis system. Samples of 1:10 FM1002F prepared using centrifugation to remove aggregates, as described above, were compared to samples that were not centrifuged to determine the effects of centrifugation. Top row of FIG. 2(A) shows SEM micrographs of samples of 1:10 FM1002F that was prepared without (left) and with (right) centrifugal treatment. Uniformity of the surface was greatly improved with centrifugation. Bottom row of FIG. 2(A) shows 2D mapping of elemental iron of the same fields of view as the top row. The non-centrifuged sample (left) has more overall iron content, but the centrifuged sample (right) has much improved homogeneity of iron distribution. It is clearly evident that centrifugation of the resist prior to processing resulted in a more homogeneous distribution of FeNPs. However, this had the trade off of greatly reducing, in some cases by more than half, the content of FeNPs in the composite FM1002F photoresists.

FIG. 2(B) depicts a graph showing the FeNP content, by weight fraction, of fully processed FM1002F with (solid line) and without (dashed line) centrifugal treatment for each doping ratio. These were calculated by correcting the prescribed weight ratios (1:200 to 1:2) to account for evaporation of solvent and then correlating these values with the elemental iron content of noncentrifuged samples, as determined by X-ray microanalysis. From this, the FeNP content of the centrifuged samples was calculated. The FeNP content was dramatically reduced by centrifugation.

Light Transmission of Ferromagnetic Photoresist.

Variation in bulk light transmission across each sample was very low, which can be attributed to the homogeneity conferred by centrifuge treatment. The largest deviation in transmission (from the mean) for any wavelength for all samples was 6%, and the majority of samples had deviations under 1%. It is important to understand the effect of iron oxide doping of the photoresist on its light transmission for two reasons. The first is so that UV exposure times can be properly adjusted during UV photopolymerization of the photoresist to compensate for increased attenuation of the UV energy by the nanoparticles. The second is for use of the FM1002F dependent on the transmissive optical properties of the resist, such as fluorescence imaging of adherent cells, as we are reporting. For inverted fluorescence microscopy systems, especially, for example, the laser scanning confocal microscope used in this work where both the excitation and emission light paths pass through the photoresist, attenuation of the light energy must be considered.

Figure 3A:
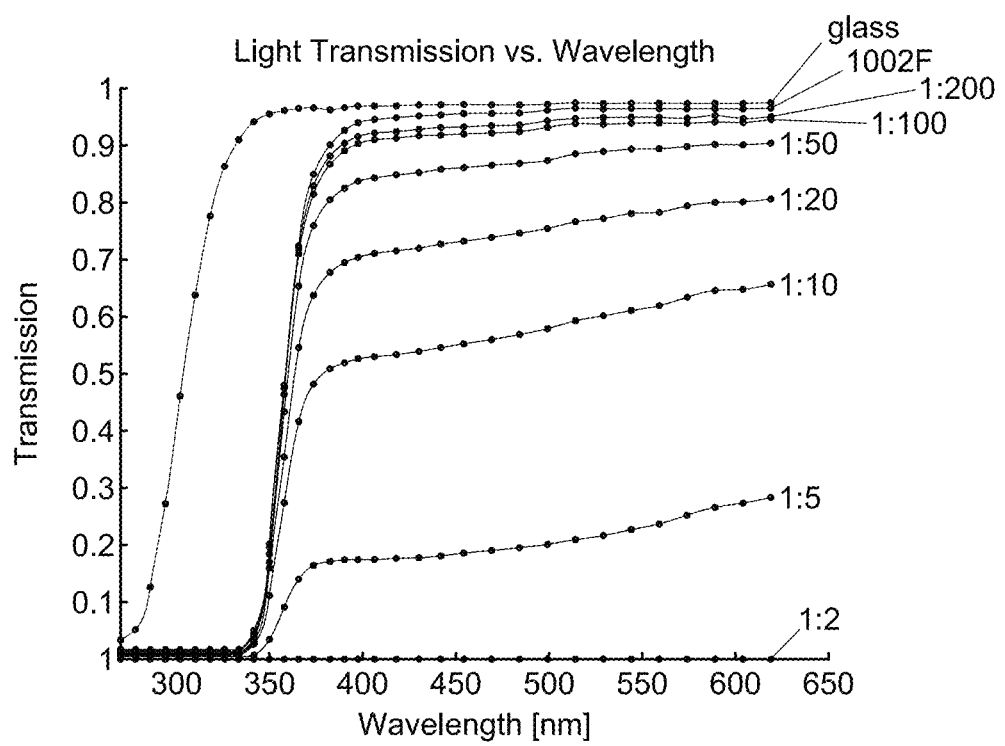
FIG. 3(A) shows a graph of light transmission versus wavelength for glass, standard 1002F, and each of the FeNP-doped samples.

In FIGS. 3(A) and (B), light transmission of FeNP-doped 1002F are shown. The transmission of light through the FM1002F preparations and standard 1002F was measured across a range of wavelengths. FIG. 3(A) shows a graph of light transmission versus wavelength for glass, standard 1002F, and each of the FeNP-doped samples. The transmission for all wavelengths decreased as FeNP content was increased. As expected, there is a trend of decreasing transmission with increasing FeNP content for all wavelengths measured. Attenuation is minimal for low doping ratios but becomes significant at higher ratios. Attenuation decreases slightly as wavelength increases, which is possibly explained by decreased Rayleigh scattering by the nanoparticles at longer wavelengths.

Figure 3B:
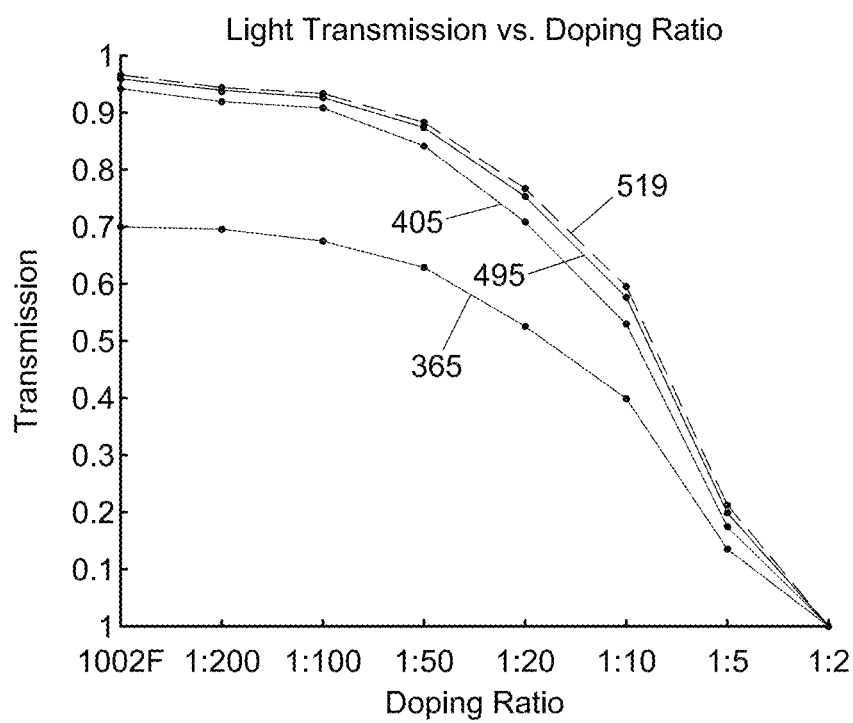
FIG. 3(B) shows a graph of the attenuation of light versus doping ratio for four specific wavelengths: 365, 405, 495, and 519 nm.

FIG. 3(B) shows a graph of the attenuation of light versus doping ratio for four specific wavelengths: 365, 405, 495, and 519 nm. These wavelengths were chosen to coincide with the I- and H-lines (365 and 405 nm) produced by mercury-based UV exposure systems and the excitation and emission wavelengths (495 and 519 nm) for the popular fluorescent marker, Alexa Flour 488. This Figure suggests that processing results could be improved by the use of a long-pass filter to block shorter UV wavelengths and deliver a more uniform UV dosage throughout the thickness of the photoresist. It also indicates that light energy reaching, as well as being emitted from, fluorophores in immunofluorescence applications will experience greater attenuation with increasing levels of FeNP doping. This may be significant in applications where very weak fluorescent signals are expected.

Biocompatibility of Ferromagnetic Photoresist.

The rate of proliferation of 3T3 cells on substrates of FM1002F can be used as a metric to measure their biocompatibility. The biophysical properties of the 1002F photoresist have been previously shown to be better than SU-8, which itself is frequently used in biological microelectromechanical systems (BioMEMS) devices that are integrated with cells in culture and classified as a nonirritant. (See Rowe, L.; Almasri, M.; Lee, K.; Fogleman, N.; Brewer, G. J.; Nam, Y.; Wheeler, B. C.; Vukasinovic, J.; Glezer, A.; Frazier, A. B. Lab Chip 2007, 7, 475-482; Li, M.; Glawe, J.; Mills, D.; McShane, M.; Gale, B. 2000; Vol. 66, pp. 531-536. Choi, Y.; Choi, S.; Powers, R.; Allen, M. Tech. Dig. Solid-State Sensor and Actuator Workshop (Hilton Head 2000), Transducers Research Foundation, Hilton Head Island, S.C., Jun. 4-8, 2000; pp 286-289; Musick, K.; Khatamia, D.; Wheeler, B. C. Lab Chip 2009, 9, 2036; Kotzar, G.; Freas, M.; Abel, P.; Fleischman, A.; Roy, S.; Zorman, C.; Moran, J. M.; Melzak, J. Biomaterials 2002, 23, 2737-2750.)

Figure 4:
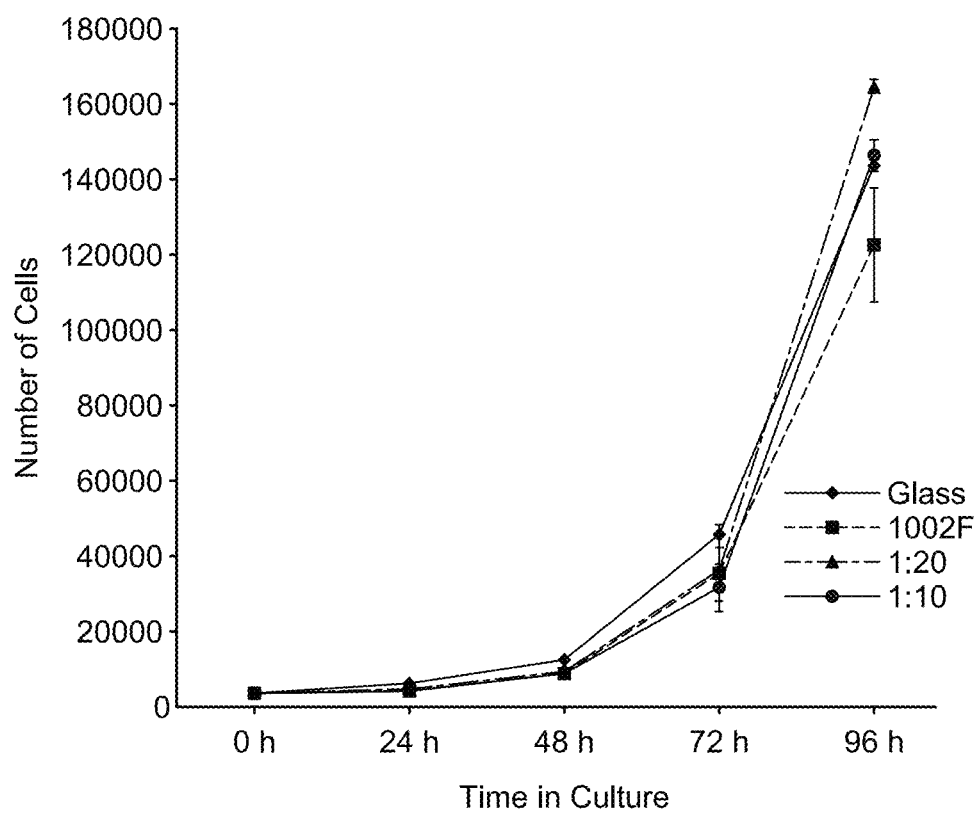
FIG. 4 depicts a graph showing the biocompatibility of FeNP-doped 1002F as demonstrated by the rate of proliferation of fibroblast cells on its surface vs. glass and standard 1002F.

Growth rates on fibronectin-coated substrates of glass, undoped 1002F, and FM1002F at two doping levels are compared. FIG. 4 depicts a graph for showing the biocompatibility of FeNP-doped 1002F. The graph shows growth rate of NIH/3T3 cells on fibronectin-coated substrates of glass, 1002F, 1:20 FM1002F, and 1:10 FM1002F. There was no statistical difference among growth rates on the various substrates, and no correlation was seen between growth rate and nanoparticle doping level, suggesting that incorporation of the nanoparticles did not affect the biocompatibility of the 1002F photoresist. The experiment was designed to encompass the period of fastest growth of the 3T3 cells, which has been previously shown to be 48 to 72 h after plating. (See Thurston, G.; Palcic, B. Cell Motil. Cytoskeleton 1987, 7, 361-367.) For the micropallet array application discussed in this disclosure and, it is believed, for a majority of other cell-interacting applications for which this material would be of use, cells will not remain in contact with the FM1002F for nearly this long of a time period. Conversely, while not expected to exist, long-term post exposure effects on the cells remain unknown. It was noted that throughout this experiment as well all subsequent experiments no difference in the morphology, behavior, appearance, or other metric was seen between cells on substrates of FM1002F as compared with standard 1002F.

Photopatternability of Ferromagnetic Photoresist.

Figure 5A:
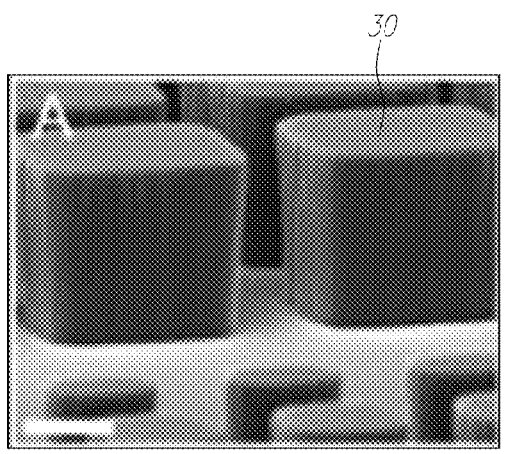
FIGS. 5(A)-(D) depict SEM micrographs for showing the photopatternability of FeNP-doped 1002F.
Figure 5B:
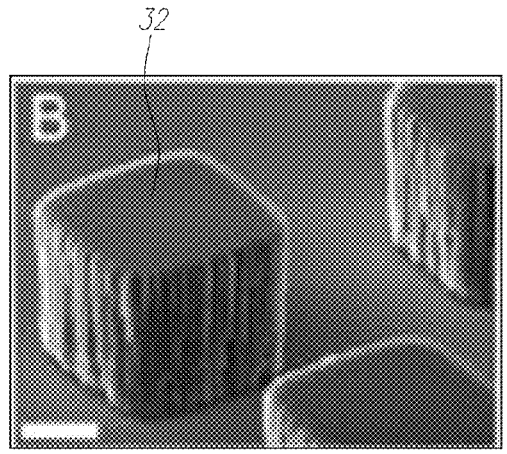
Figure 5C:
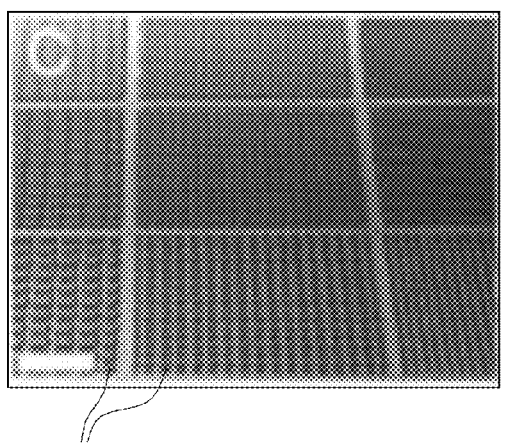
Figure 5D:
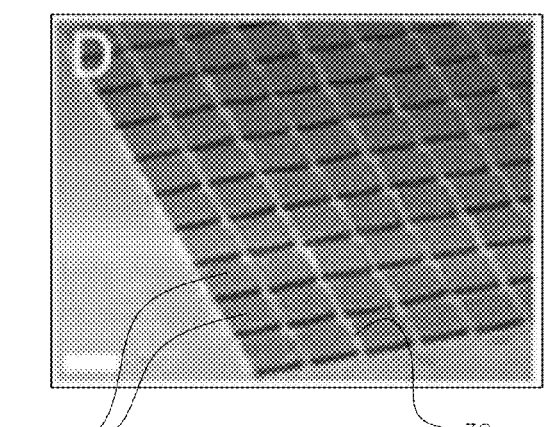

FIGS. 5(A)-(D) depict SEM micrographs for showing the photopatternability of FeNP-doped 1002F. FM1002F was spin-coated to create 50 μm thick layers and photopatterned using a photomask with a test pattern of various dimensions. FIG. 5(A) depicts 50×50 μm 30 and 25×25 μm (foreground) pallets made from 1:200 FM1002F. Scale bar is 25 μm. FIG. 5(B) depicts 50×50 μm pallet 32 made from 1:10 FM1002F. The increased number of nanoparticles in the FM1002F affects the appearance of the microstructure sidewalls, but the photopatterning of small structures remains practical. FIG. 5(C) depicts pallets 34 of various dimensions made from 1:10 FM1002F. The test pattern consisted of arrays of squares with side lengths of 25-200 μm and spacings of 10-75 μm. Scale bar is 1 mm. FIG. 5(D) depicts 200×200 μm pallets 36 with 50 μm spacings 38 made from 1:2 FM1002F. Scale bar is 250 μm.

All preparations of FM1002F, including the most heavily doped 1:2 preparation, were patternable using standard UV lithography techniques. For low doping ratios, that is 1:200, 1:100 and 1:50, microstructures had smooth, near-vertical sidewalls and were very similar in appearance to microstructures made from standard 1002F (see FIG. 5(A)). Microstructures 50 μm in height with 10 μm features could be created with these doping ratios. However, the quality of the microstructure sidewall deteriorates as the number of FeNPs in the photoresist is increased, as can be seen in FIG. 5(B), and resolving 10 μm features becomes difficult for doping ratios 1:20 and 1:10.

Nevertheless, structures with dimensions near those of standard micropallets (40×40 and 30 μm gaps) are easily patternable in 50 μm thick coatings of FM1002F doped at ratios as high as 1:10. Microstructures composed of 1:10 FM1002F and of various dimensions that were made using the test photomask can be seen in FIG. 5(C).

Even the most heavily doped preparation (1:2) of FM1002F was patternable, as can be seen in FIG. 5(D). 200×200 μm pallets with 75 or 50 μm gaps were created with 1:2 FM1002F, although adhesion to the glass substrate was partially compromised.

Adherence of Extracellular Matrix Coatings to Magnetic Micropallets.

Immunofluorescence imaging confirmed that the deposition and adherence of fibronectin on micropallets was not detrimentally affected by the incorporation of FeNPs.

Figure 6A:
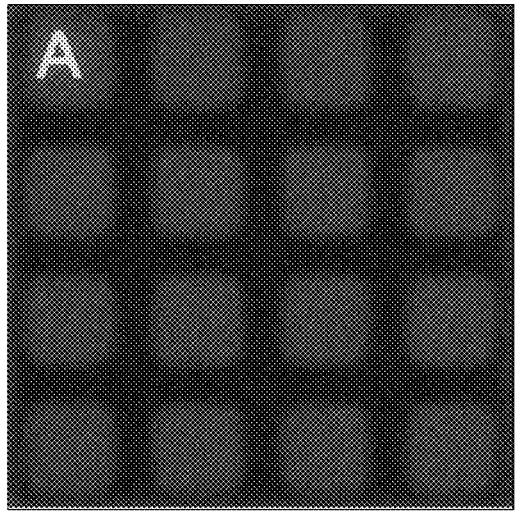
FIGS. 6(A)-(D) depict immunofluorescence micrographs for showing the capacity to support extracellular matrix component coatings.

FIGS. 6(A)-(D) depict immunofluorescence micrographs for showing the capacity to support extracellular matrix component coatings. Micropallets made from 1002F or FM1002F were coated with fibronectin that was subsequently immunofluorescently labeled. Immunofluorescence micrographs were obtained using a scanning laser confocal microscope. Micropallets are 40×40 μm. FIG. 6(A) depicts a control image showing minimal background fluorescence from a standard, uncoated micropallet array that was subjected to the full staining protocol.

Figure 6B:
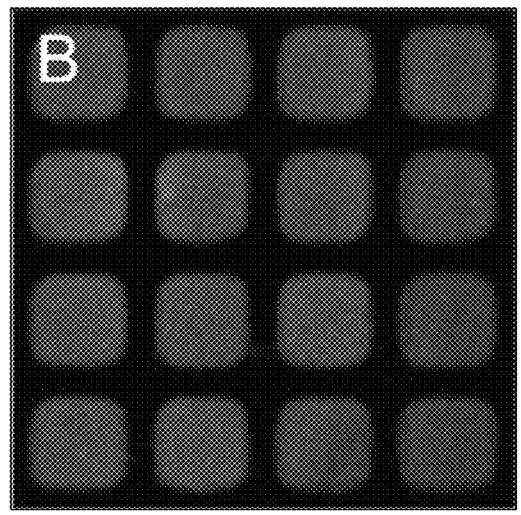
Figure 6C:
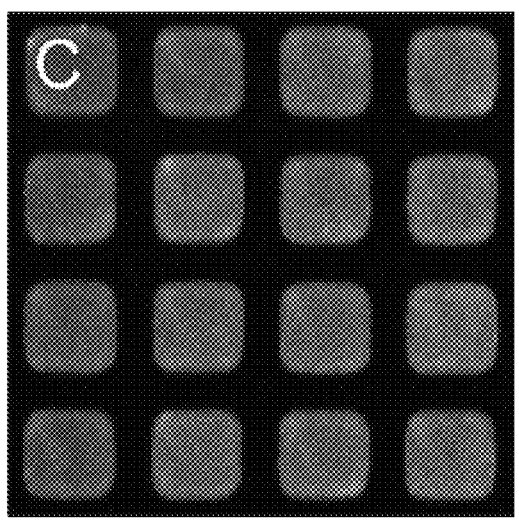
Figure 6D:
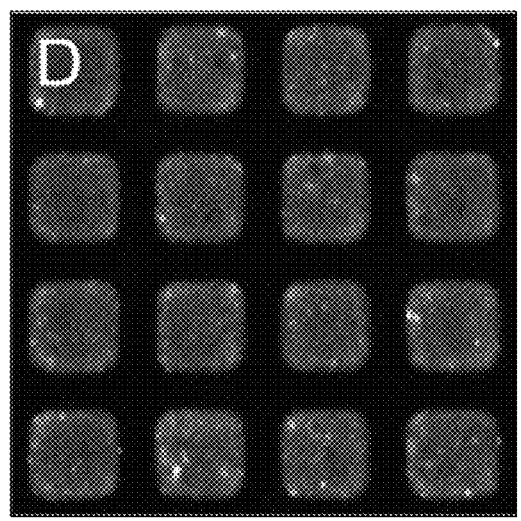

FIGS. 6(B)-(D) depict a standard micropallet array and arrays made from 1:50 and 1:10 FM1002F, respectively, which were coated with fibronectin and subsequently evaluated by immunofluorescence for the integrity of the fibronectin coatings. The fibronectin coatings appear similar across all three arrays, although some heterogeneity in the fluorescent signal, seen as bright areas, is observed for the array made from 1:10 FM1002F. Whereas a centrifuge treatment was employed to remove large aggregates of nanoparticles from the ferromagnetic photoresists, some small aggregates remain and are more prevalent with increasing amounts of FeNPs, possibly accounting for the apparent slight heterogeneity in the fibronectin coating at higher doping ratios, seen best in panel D. Overall, this experiment suggests that a similar amount of fibronectin was deposited on micropallets made from FM1002F as compared with standard 1002F and that the fibronectin was well-adhered and extended to the boundary of the micropallets in all cases.

Immunofluorescence Imaging of Cells on Magnetic Micropallets.

Immunofluorescently labeled rat neu-expressing 3T3 cells were imaged in two fluorescence channels and phase contrast using an LSM 510 meta laser scanning confocal microscope.

Figure 7A:
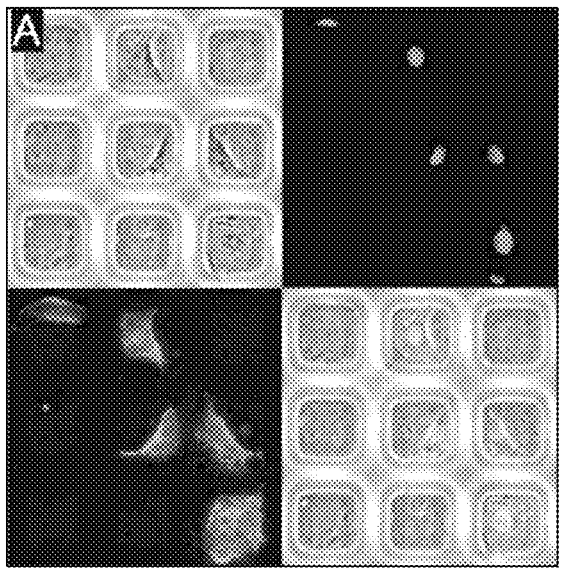
FIGS. 7(A)-(B) depict phase contrast and immunofluorescence cellular imaging.
Figure 7B:
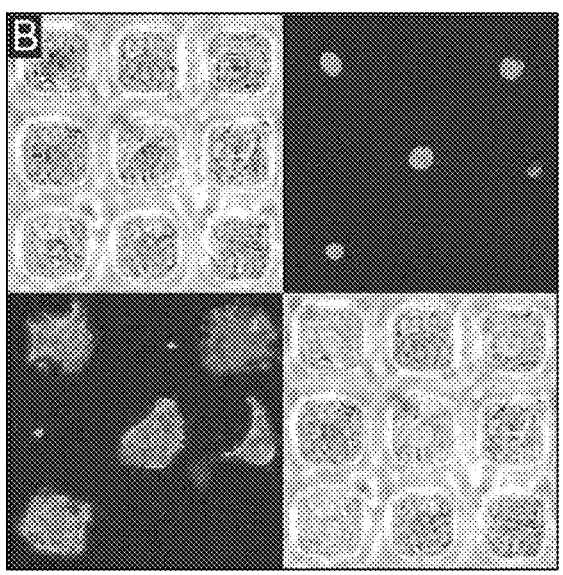

FIGS. 7(A)-(B) depict immunofluorescence cellular imaging. NIH/3T3 cells expressing rat neu were plated onto micropallet arrays made from 1:50 and 1:10 FM1002F and stained with Hoechst 33342, a primary mouse antibody against neu and a fluorescently labeled secondary antimouse antibody. Dual channel immunofluorescence imaging was performed using a scanning laser confocal microscope. Micropallets are 40×40 µm. FIGS. 7(A)-(B) depict Micropallets made from 1:50 FM1002F or 1:10 FM1002F, respectively. Disruption of signal in phase contrast images is increased with increased FeNP content, but the signals in fluorescence channels are largely unaffected.

As can be seen in FIG. 7(A), the FeNP content of the micropallets made with 1:50 FM1002F had nearly zero impact on image quality, and the cells are clearly visible in all channels. The phase contrast image and fluorescence signals are bright and undisrupted. However, as the number of FeNPs in the micropallets is increased, the impact on imaging quality also increases.

In FIG. 7(B), which shows cells on micropallets made from 1:10 FM1002F, it is very difficult to discern the presence of all cells using the phase contrast channel. However, the fluorescence signals from the cell surface markers and nuclear stain remain strong and undistorted, thereby allowing easy identification of cells in these channels. Micropallet arrays imaged in the absence of primary antineu antibody revealed no non-specific background staining (data not shown). There is some distortion and attenuation of the fluorescent signals due to aggregates of FeNPs, but it is minimal, and overall attenuation of the signal strength is not apparent. Overall, lower doping ratios of FeNPs prove to be more advantageous for imaging purposes, and depending on specific applications, for example, the need for cellular identification using the phase contrast channel, a trade-off of improved imaging quality versus decrease in magnetic attractive force can be made.

Single Cell Recovery Using Magnetic Micropallets.

In the case of nonmagnetic micropallets, released micropallets can be collected by mating the micropallet array with a separate array of micro wells and inverting the whole configuration such that loose micropallets fall into an array of collection wells. (Refer to FIG. 1(C).) However, in the present embodiment, magnetic micropallets enable released micropallets to be individually recovered directly from the surface of the array with an appropriate magnetic collection device. In the present embodiment, a simple collection probe based on a small permanent magnetic was used to collect released micropallets easily. The distance at which the micropallet was captured depended on the amount of FeNPs present in the micropallet. For example, micropallets made from 1:50 FM1002F were captured at a distance of roughly 1 to 2 mm, whereas micropallets made from 1:10 FM1002F could be captured at a distance of 5 mm or more. Magnetic micropallets made from all preparations of FM1002F (1:2 to 1:200) were collectable, although attraction was especially weak at the lower end of the set (1:200).

Micropallets made from 1:50 FM1002F were used for single micropallet/cell collection experiments because this preparation was found to offer the best compromise between optical clarity and magnetic responsiveness. FIGS. 8(A)-(D) depict graphs for showing the release and collection of individual FM1002F micropallet and adherent cell. Single magnetic micropallets were released from the array using a laser and collected with a permanent magnet.

Figure 8A:
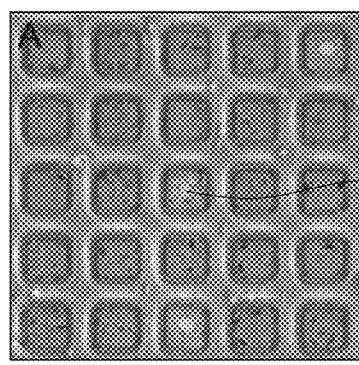
FIGS. 8(A)-(D) depict micrographs for showing the release and collection of individual FM1002F micropallet and adhered cell.
Figure 8B:
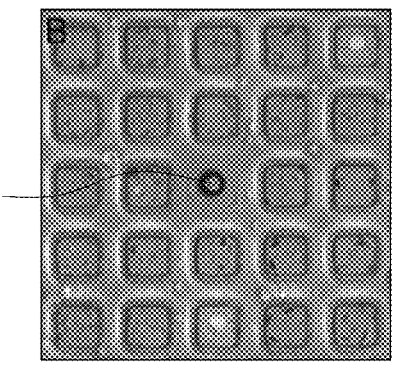
Figure 8C:
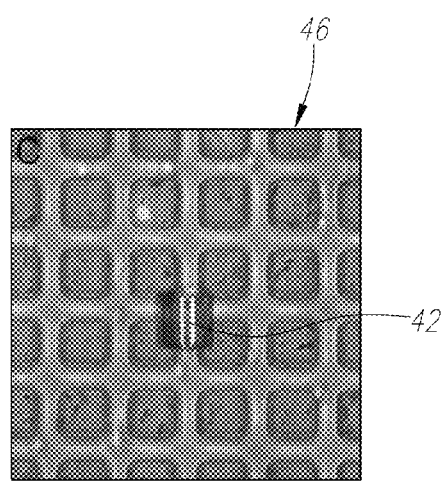

FIGS. 8(A)-(C) show a single micropallet with adhered cell being released from an array and coming to rest on the array's surface near the point of release. The micropallet is collected directly from this position. Single micropallets can be released and collected without any disturbance of neighboring micropallets or nearby cells. In FIG. 8(A), a micropallet 42 holding a cell of interest is identified using microscopy. In FIG. 8(B), the targeted micropallet 42 is released by firing a pulsed laser focused at the glass-micropallet interface, which ablates micropallet material, producing rapidly expanding gas that ejects the micropallet from its position. Remnants of a bubble 44 formed by the ablative process can be seen in the footprint from where the micropallet was released. In FIG. 8(C), released micropallet 42 resting on the surface of the array 46, 500 µm from its initial position. The cell remains adhered to the micropallet and minimally perturbed. At this point, the magnetic collection probe is brought into the proximity of the micropallet, and the micropallet rises from its resting place and into contact with the probe.

Figure 8D:
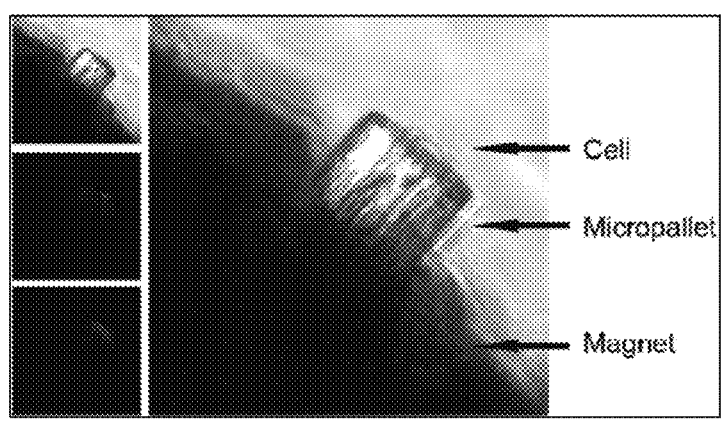

FIG. 8(D) shows the micropallet and single cell after recovery being held by a 1 mm diameter neodymium rare earth magnet. The magnetic force holds the micropallet to the magnet throughout the collection procedure and passage through air-liquid interfaces after capture. Such passages are necessary to transfer the micropallet and cell to downstream vessels, such as tissue culture plates or PCR tubes. Micropallets made from FM1002F at doping ratios of 1:50 and greater (i.e., 1:20, 1:10) were held firmly to the magnet during this process. In FIG. 8(D), the micropallet is magnetically attracted and held to the permanent magnet after collection. The cell remains adhered to the micropallet. The three left panels are the phase contrast (top) and the two fluorescence channels (nuclear stain; middle and rat neu surface marker; bottom) of the image separated for easier identification of the cell. It was noted that although the laser ablative technique of micropallet release delivers a concentrated dose of light energy, discernible photobleaching of the fluorescence markers has not been observed. The series of photomicrographs in FIG. 8(D) depict results that have been reproduced >50×.

Single Cell PCR Analysis.

Because the micropallet arrays platform has the potential to be applied to the study of individual cells at the molecular level, it was of interest to establish the feasibility of analyzing the gene expression of recovered individual cells using single cell RT-qPCR. The expression levels of both β-actin and rat neu genes were detected and quantified with RTqPCR analysis of cDNA that was reverse transcribed and amplified from RNA of single cells recovered using magnetic micropallets and delivered to PCR tubes using small rare earth magnets as described above.

Figure 9:
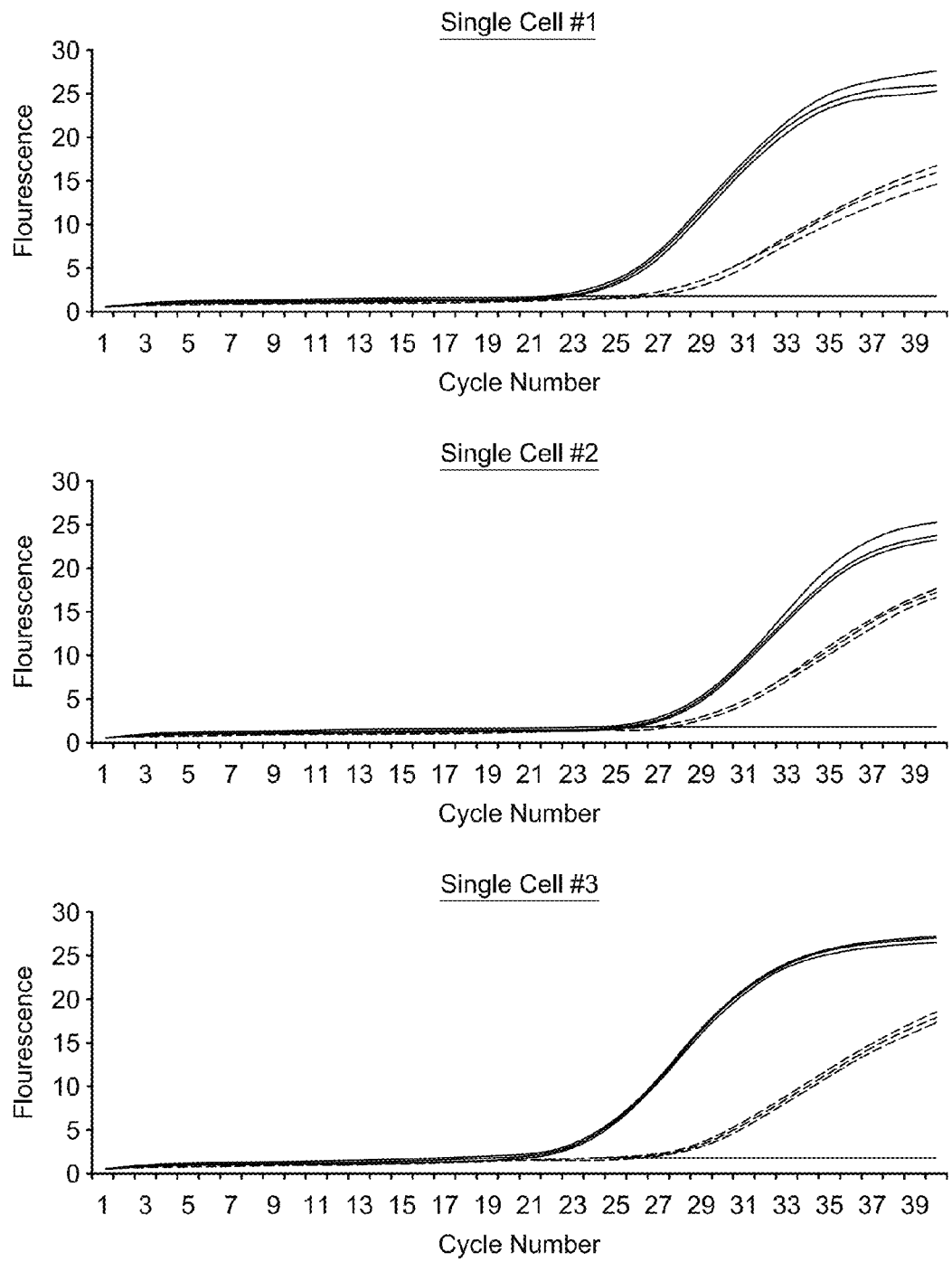
FIG. 9 depicts the RT-qPCR amplification curves of three individual sets of cells that were recovered and analyzed.

FIG. 9 depicts RT-qPCR traces from analysis of three separate cells collected on individual micropallets. Black solid lines show the amplification of rat neu and black dashed lines show the amplification of β-actin, both of which were analyzed in triplicate for each single cell. NTC and -RT controls are both represented by gray lines. Rat neu and β-actin were detected for all single cell samples and all controls were negative for presence of cDNA.

In FIG. 9, each set included an individual micropallet with a single rat neu-expressing 3T3 cell. Transcripts for both β-actin and rat neu could be detected for each individual cell, and -RT controls were negative for cDNA presence. The average threshold cycle (Ct) values for all single cell samples were 26.80±0.26 for β-actin and 22.99±2.20 for rat neu. There is some variability in the expression of rat neu of the three single cells that were analyzed, but this is not unexpected because the cells were not synchronized nor recently subcloned, and some variance in rat neu mRNA levels is anticipated between individual cells. Micropallets without cells (NTCs) did not yield a detectable signal over three separate experiments. These data provide proof of principle for the quantitative detection of specific mRNA sequences from single cells recovered from the micropallet array.

The capacity to impart magnetic properties to photoresist polymer has been established while maintaining the fundamental biophysical properties that make the photoresist ideally suited for BioMEMS applications. These biophysical properties of the ferromagnetic photoresist include biocompatibility, photopatternability, capacity to support ECM biomolecule coatings, and minimal degradation of both light transmission and optical clarity relative to standard 1002F photoresist. Varying the doping ratio has been demonstrated to allow tuning of optical and magnetic properties to accommodate particular applications. This material would also be useful in a multitude of magnetically actuated microstructure systems, such as magnetically deformable cantilevers for micro-optical applications, mechanical switches in RF-MEMS applications, magnetically actuated valves in microfluidics applications, and so on.

Strengthened magnetic properties of FM1002F has been observed with increasing doping ratios at the expense of degradation of photopatternability and biophysical properties. This suggests that optimal doping ratios for individual applications will need to be determined. Similarly, the advantages of centrifugation of the FM1002F mixture prior to photopatterning. Interestingly have been demonstrated, other forms of magnetic nanoparticles have been used to impart magnetic properties, but these resulted in photoresist with deficient optical properties and other characteristics that compromised the resultant microstructures. In similar work reported by Damean et al., nickel nanospheres were incorporated into SU-8 to create magnetically actuatable cantilevers, but the maximum doping ratio reported was only 1:6.51 (13.3% nanospheres by weight). Therefore, the choice of magnetic compound is also an important consideration that affects magnetic and optical properties and processing capabilities.

The ferromagnetic photoresist described herein was used to refine an advanced cell analysis platform for adherent cells, micropallet arrays, by creating magnetically manipulatable micropallets. The ability to collect magnetically and manipulate released micropallets greatly improves system throughput and paves the way for automation of the collection process. In addition to improved throughput, magnetic manipulation enables the transfer of individual released micropallets with remarkably increased precision. Afforded this new capability, we used the magnetic micropallet arrays platform to isolate and perform single-cell RT-qPCR analysis on single cells positively selected and recovered from a population of over 10,000 cells. The ability to collect and transfer released micropallets via magnetic means allows rapid, sequential release and recovery events without the problems associated with the use of nonmagnetic micropallets.

Also, importantly for single cell PCR analysis, the collected micropallet and cell can be delivered directly into PCR analysis reagents, that is, lysis buffer, in a PCR tube. Such analysis requires transfer of the cell into very small volumes of liquid (10 μL) and thus would not be possible using prior collection methods, that is, the previously described inversion technique that is required for collection of nonmagnetic micropallets, because this method delivers the micropallet in a very large volume of liquid.

Therefore, this refinement of the micropallet array overcomes several drawbacks of previous renditions of the technology, expressly: (1) generally only one micropallet could be released and collected in each inversion process (because of confusion of micropallet identities if multiple, unindexed micropallets were simultaneously released and collected), (2) in the inversion method, the array of collection wells must be scanned to locate released micropallets, and (3) by nature of this method, collected micropallets were present within a relatively very large volume of liquid after collection.

The addition of magnetic properties to the micropallet array provides greatly improved functionality to the base platform while not impeding any of the virtues that makes micropallet arrays a unique and powerful cell-handling technology. This opens the opportunity for development of more efficient tools and devices to improve collection and handling of released individual micropallets further. In the future, collection probes based on electromagnets, or which cleverly utilize permanent magnets, can be made such that micropallets are collected and delivered sans magnet. This disclosure presents the first, foundational step toward the next generation of the micropallet arrays platform and further BioMEMS devices constructed from ferromagnetic photoresist.

While the invention has been described in connection with specific examples and various embodiments, it should be readily understood by those skilled in the art that many modifications and adaptations of the invention described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. An assembly for addressable biochemical analysis comprising an array of pallets releasably attached to a substrate and removable from the substrate upon application of an energy pulse applied along the substrate at the location of a pallet of interest, wherein each of the pallets comprises magnetically responsive material enabling each pallet to be manipulated by a magnetic field; and a collection probe for generating the magnetic field to operably couple to the pallet of interest when removed from the substrate and configured to maintain a collected pallet of interest submerged in liquid, wherein the collection probe has a rod and a magnet attaching to the rod, wherein the magnet is detachable from the probe for collection of the magnet and the pallet coupled to the magnet, wherein the magnet is a permanent magnet that allows immediate generation and cessation of the magnetic field to attract and hold a pallet to collect the pallet of interest when removed from the substrate, wherein the permanent magnet is removable from the rod, wherein the probe has a collection cavity that keeps a collected pallet of interest submerged in liquid throughout a transfer process.

2. The assembly of claim 1 wherein the magnetically responsive material comprises magnetic nano-particles or micro-particles.

3. The assembly of claim 2 wherein the magnetic particles comprise iron or nickel.

4. The assembly of claim 1 wherein the each of the pallets is formed from a ferromagnetic photopolymer.

5. A device for addressable biochemical analysis comprising a plate having a top surface, an array of pallets releasably attached to the top surface of the plate and dislodgeable from the top surface upon application of a force applied along the plate at the location of a pallet of interest, wherein each of the pallets comprises magnetically responsive material enabling each pallet to be manipulated by a magnetic field, and a collection probe for generating the magnetic field to collect the pallet when released from the top surface of the plate and configured to maintain a collected pallet of interest submerged in liquid, wherein the collection probe has a rod and a magnet attaching to the rod, wherein the magnet is detachable from the probe for collection of the magnet and the pallet coupled to the magnet, wherein the probe has a collection cavity that keeps the collected pallet of interest submerged in liquid throughout a transfer process.

6. The device of claim 5 wherein the magnetically responsive material comprises magnetic nano-particles.

7. The device of claim 6 wherein the magnetic particles comprise iron or nickel.

8. The device of claim 5 wherein the each of the pallets is formed from a ferromagnetic photopolymer.

9. The device of claim 5 wherein the force is an energy pulse.

10. The assembly of claim 5 wherein the magnet is an electro magnet.

* * * * *